March 7, 1967 H. R. BOHANON 3,307,469
VENTILATING AND CIRCULATING AIR SYSTEM
Filed Feb. 10, 1966
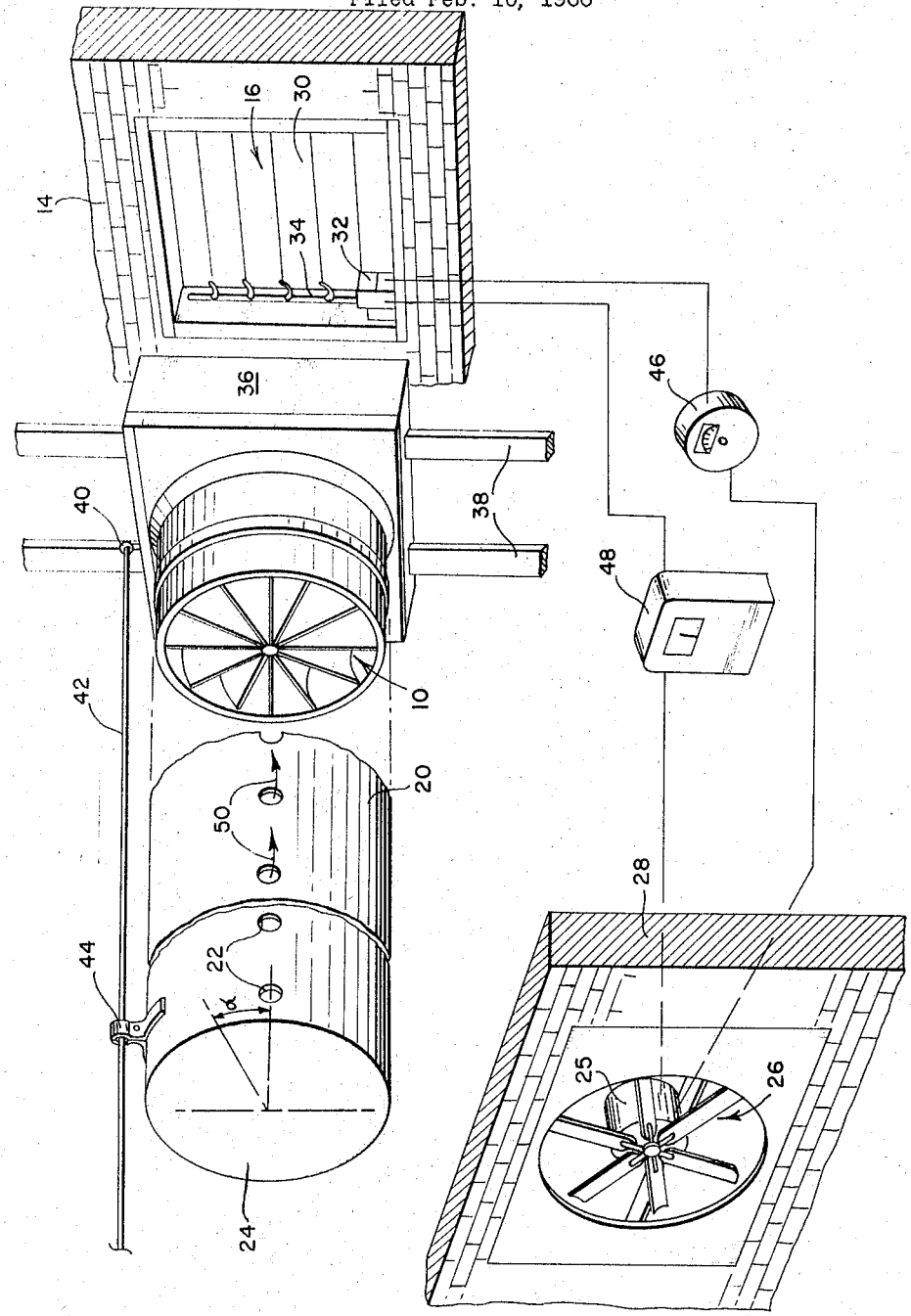
INVENTOR
HOY R. BOHANON
BY Semmes & Semmes
ATTORNEYS

3,307,469
VENTILATING AND CIRCULATING AIR SYSTEM
Hoy R. Bohanon, Muskogee, Okla., assignor to Acme Engineering and Manufacturing Corporation, Muskogee, Okla., a corporation of Oklahoma
Filed Feb. 10, 1966, Ser. No. 526,562
10 Claims. (Cl. 98—33)

The present invention relates generally to a ventilating and circulating air system for large buildings. In particular, the present system is designed to provide during winter large quantities of fresh outdoor air for ventilation without creating cold drafts, as well as providing continuous recirculation of air that is evenly distributed.

There exists today a need for inexpensive ventilating systems for large buildings that will admit large quantities of outside air in winter weather without creating cold drafts within the enclosed space. Most present ventilating systems pull outside air through relatively large openings in the building wall, the resultant large jet not being well mixed with air inside the building thus creating cold spots and drafts. In fact, many large buildings even develop cold spots in the absence of ventilation because of stratification of air within the building. The solution of this problem in a system providing for adequate ventilation obviously has many applications.

More particularly, a need exists for providing a multi-purpose tube ventilation system capable of performing all air handling and ventilating needs in a greenhouse during the cool and winter seasons. Such greenhouse ventilating systems, in addition to providing fresh air during the fall, winter and spring seasons without cold drafts, as well as uniform temperature distribution, must perform the additional functions of providing continuous recirculation of air that is evenly distributed.

Accordingly, an object of the present invention is to provide fresh outdoor air for ventilation without cold drafts while providing a continuous recirculation of evenly distributed air.

A further object of the present invention is to provide in a greenhouse fresh outdoor air for ventilation without cold drafts including controlling house temperature by admitting cool outside air when required.

Still a further object of the present invention is to provide in a greenhouse a continuous recirculation of air that is evenly distributed including producing uniform temperature and humidity as well as better leaf surface micro-climate with gentle and continuous air movement in and around foliage such that $CO_2$ enriched air is brought into direct contact with leaf surface.

Still another object of the present invention is to provide an automatic ventilating and recirculating system characterized by motorized inlet shutter, together with thermostat or humidistat, insuring desired climate control at reduced cost.

A further object of the present invention is to eliminate flutter and subsequent tube tearing by employing stator vanes in fan-jet, thus preventing violent discharge vorticity as in conventional tube type fans.

Still another object of the present invention is to permit the use of existing exhaust fans of fan and pad or of mechanical greenhouse ventilation system in the present combined ventilating and circulating air system.

Still a further object of the present invention is to provide variation in tube size and fan selection for wide range of capacity resulting in efficient low cost greenhouse climate control.

A further object of the present invention is to improve the performance and efficiency of fan-jet unit with stator vane type fans which recover the rotational energy of discharging air stream.

Another object of the present invention is to insure quiet performance in ventilating and circulating air system.

Other objects will become apparent from the ensuing specification and attached drawing, wherein:

The figure is a perspective view of subject ventilating and circulating air system.

As seen in the figure, the present system consists generally of a distribution fan 10 mounted inside a building and spaced a predetermined distance from wall 14 which contains air inlet shutter 16. The discharge of distribution fan 10 is connected to a long tube 20 which extends a desired length of the building and contains spaced openings 22 along the entire extent thereof. End 24 of tube 20 is closed, and normally, tube 20 extends the entire length of building. Finally, ventilating fan 26 is mounted in wall 28 at other end of building for discharging air to outside.

More specifically, motorized shutter 16 contains a plurality of balanced blades 30 operable by motor 32 through actuating rods 34 in conventional manner.

Distribution fan unit 10 is supported or suspended from the building with any concentional structure which may, for example, include a frame 36 supported by vertical members 38. At the top of frame 36 may be located a ring 40 to which wire 42 is attached for supporting tube 20 with wire snap ring 44. Of course, the other end of wire 42 may be attached to appropriate building structure. The use of stator vanes in distribution fan unit 10 eliminates flutter and subsequent tearing of adjacent portions of tubing 20 by preventing violent discharge vorticity as in conventional tube fans. In addition, the use of such a stator vane type fan recovers rotational energy of discharging air stream and improves performance and efficiency in general.

As will be described in detail hereinafter, the actuation of motor 25 of ventilating fan 26 and motor 32 of shutter 16, may, if desired, be controlled by thermostat 46 and/or humidistat 48, wired conventionally in accordance with desired results.

*Ventilating*

During the ventilating mode of operation, both distribution fan unit 10 and ventilating unit fan 26 are running while shutter 16 is in open position. Thus, ventilating fan 26 removes air from the building and creates a slight vacuum therein. Outside air, being at a slightly higher pressure, enters into the building through shutter 16. Since distribution fan 10 is located immediately in front of the opening defined by shutter 16, fresh outdoor air is picked up and discharged into the tube 20. Subsequently, outdoor fresh air is discharged within the interior of building through openings 22 in the surface of tube 20 throughout the entire length of building. The resulting small jets 50 are well mixed with the air inside building by turbulent mixing and a very uniform condition exists throughout.

Thus, the present system runs continuously providing constant and uniform air movement, temperature and humidity control throughout. During operation in its contemplated use in a greenhouse, when $CO_2$ is added to the house, it discharges it evenly and maintains a better leaf surface micro-climate by bringing the $CO_2$ enriched air into more direct contact with the leaf surface. When the house temperature reaches the maximum desired, usually on a sunny day, automatic control of ventilating fan 26 and shutter 16 may be achieved by thermostat 46 and humidistat 48. As indicated before, the slight vacuum created in the house causes fresh cool outdoor air to rush in through the inlet shutter 16 and "jump the gap" right into the continuously running fan-jet unit 10 and discharge uniformly through openings 22 and thoroughly mix with the warm air before reaching the plants. When the desired temperature and/or humidity conditions have been reached, ventilating fan 26 and shutter 16 may be turned off automatically and the recirculation and uniform air movement process permitted to continue. The marginal limits of the present convection tube ventilation system occur in mild weather. During cold weather fan unit 10 cycles on and off to maintain the requirements of temperature and humidity control. As the outside temperature increases the fan unit 10 runs for longer intervals until continuous running is achieved to meet control requirements. By this time, the outside air temperature is usually warm enough that any additional air required can be admitted into the house.

*Circulating*

In the circulating mode of operation, ventilating fan 26 is inoperative and shutter 16 is closed. Only distribution fan 10 is running to pull air from within building through space between distribution fan 10 and shutter 16 into the inlet of distribution fan 10. In this manner, indoor air is discharged into distribution tube 20 and blown back into the building through the small openings 22 on the surface of tube 20. The resultant turbulence and mixing will again promote uniform conditions within building.

Of course, many important details go into the application of the present system to a given building. For example, the size and number of fan units will be determined by the ventilating requirements of the building and its contents while the tubes are arranged to distribute the outside air uniformly over the building as uniform air distribution is the first requirement for maintaining desired conditions. Usually, the simplest and most economical arrangement is to run the tubes lengthwise down the building. As the capacity of exhaust fan(s) 26 must be matched with the capacity of recirculating or distribution fan(s) 10, this will dictate the size of "adjustable opening" which, in practice, may be performed by either a manually operated or motorized shutter 16. Tube 20 can be made of almost any material. Presently, cost factors dictate that tube 20 be made of thin film plastic. Thus, as tube 20 is non-rigid, fan air pressure holds it in its contemplated round shape. Although tube 20 is suspended during use from wire 42, when not operative it hangs limp like a rag. Obviously, nothing would preclude the use of a rigid tube. The number and size of openings 22 along the surface of tube 20 is also important as this determines how far each individual jet 50 will penetrate into the relatively quiet room air and thus how much area each tube will cover. Experimentation indicates that from two to three inches is the proper diameter of openings 22. The spacing between openings must be such that the total or aggregate area of openings 22 has the proper relationship to cross-section area and length of tube 20 and fan capacity. For tubes which are less than 100 diameters long, the ratio of total opening area to tube cross-sectional area should range from 1.0 to 1.5 for most fans. The pressure distribution in tube 20 is such that the pressure at the closed end 24 is more than at the end adjacent distribution fan 10. If this ratio is too great, there is danger that the pressure at the fan end will go below room pressure causing reverse flow through openings 22 or collapse of tube 20, if made from flexible material. On the other hand, if the total opening area is too small, it will restrict the flow of distribution fan 10 and reduce significantly the performance of the system as a whole. While the location of openings 22 is important, and varies somewhat with each application, for most instances a location within 30 degrees of the horizontal centerline of tube 20 is preferred, as illustrated by the angle α. Obviously, the location of exhaust fan 26 is not critical. As stated before, the capacity of exhaust fan 26 must match that of distribution fan 10 for best results.

As previously indicated, the entire system is adaptable to use of automatic controls which can be either humidistats or thermostats, both illustrated generally in FIG. 1, depending on which air property is most important. Usually distribution fan 10 will run continuously while ventilating fan 26 and shutter 16 will be cycled to provide the outside air needed.

Manifestly, variation and rearrangement of component parts may be envisioned without departing from the spirit and scope of invention as defined by the sub-joined claims.

I claim:

1. A ventilating and circulating air system for a room, comprising:
 (A) a shutter assembly mounted within a wall of said room;
 (B) a first fan having intake portion located a pre-determined space from said shutter assembly, said fan being directly exposed to the inside of said room through said space;
 (C) a tube assembly connected to discharge of said first fan and including a plurality of continually spaced openings for distributing jets of air within said room; and
 (D) a second fan mounted within a wall of said room.

2. A ventilating and circulating air system as in claim 1, wherein said second fan is an exhaust fan and is mounted on building wall in generally opposed position with respect to said first fan.

3. A ventilating and circulating air system as in claim 2, wherein said shutter assembly includes motorizing means, said system further including means responsive to temperature humidity changes within said building for actuating said motorizing means of said shutter assembly and said second fan, as desired.

4. A ventilating and circulating air system as in claim 3, wherein said first fan includes stator vanes for distributing air.

5. A ventilating and circulating air system as in claim 4, wherein said tube is made of non-rigid material, air pressure from said first fan holding said tube in its contemplated shape during use.

6. A ventilating and circulating air system as in claim 1, including means for alternatively opening said shutter assembly and running said second fan during substantially continuous running of said first fan.

7. A ventilating and circulating air system for a building, comprising:
 (A) a shutter assembly mounted within building wall together with motorizing means;
 (B) a first fan having an intake portion located a pre-determined distance from said shutter assembly;
 (C) a tube assembly connected to the discharge of said first fan, said tube assembly being made of non-rigid material permitting air pressure from said first fan to hold said tube in its contemplated shape during use, said tube assembly further including a plurality of continually spaced openings of pre-determined size along the extent thereof;
 (D) a second fan mounted within building wall in generally opposed relation with respect to said first fan; and (E) means responsive to temperature humidity changes within said building for actuating said motorizing means and second fan, as desired.

8. A ventilating and circulating air system as in claim 7, wherein said tube is generally circular in cross-section.

9. A ventilating and circulating air system as in claim 8, wherein said openings are located within an area of said tube defined by angles of 30° measured radially outwardly above and below the horizontal center line of said tube.

10. A ventilating and circulating air system as in claim 9, wherein the capacity of said first fan matches that of said second fan.

References Cited by the Examiner

UNITED STATES PATENTS

| | | | |
|---|---|---|---|
| 2,488,945 | 11/1949 | Troller | 98—43 |
| 3,004,277 | 10/1961 | Allred | 98—40 X |
| 3,048,094 | 8/1962 | Bailey | 98—33 |

MEYER PERLIN, *Primary Examiner.*